(12) United States Patent
Bott

(10) Patent No.: US 6,856,973 B1
(45) Date of Patent: Feb. 15, 2005

(54) METHODS AND SYSTEMS FOR ASSESSING CREDITWORTHINESS OF A COUNTRY

(75) Inventor: Uwe Bott, Mamaroneck, NY (US)

(73) Assignee: General Electric Capital Corporation, Stamford, CT (US)

(*) Notice: Subject to any disclaimer, the term of this patent is extended or adjusted under 35 U.S.C. 154(b) by 0 days.

(21) Appl. No.: 09/474,558

(22) Filed: Dec. 29, 1999

(51) Int. Cl.[7] ............................................. G06F 17/60
(52) U.S. Cl. ........................... 705/38; 705/35; 705/36
(58) Field of Search ............................. 705/35, 36, 38

(56) References Cited

U.S. PATENT DOCUMENTS

| | | | |
|---|---|---|---|
| 5,696,907 A | 12/1997 | Tom | |
| 5,729,700 A | 3/1998 | Melnikoff | |
| 5,784,696 A | 7/1998 | Melnikoff | |
| 5,806,049 A | 9/1998 | Petruzzi | |
| 6,052,674 A | * | 4/2000 | Zervides et al. ............... 705/40 |
| 6,112,190 A | 8/2000 | Fletcher et al. | |
| 6,202,053 B1 | 3/2001 | Christiansen et al. | |
| 2003/0139990 A1 | * | 7/2003 | Greco .......................... 705/35 |
| 2003/0140000 A1 | * | 7/2003 | Lee ............................... 705/38 |
| 2003/0208440 A1 | * | 11/2003 | Harada et al. .................. 705/39 |

FOREIGN PATENT DOCUMENTS

| | | | | |
|---|---|---|---|---|
| WO | WO 03/034309 | * | 4/2003 | ............ G06F/17/60 |
| WO | WO 2003034309 A | * | 4/2003 | ............ G06F/17/60 |

OTHER PUBLICATIONS

J. B. Caouette, E. I. Altman, P, Narayanan, Managing Credit Risk The Next Great Financial Challange, John Wiley & Sons, Inc. 1998, pp. 84–87, 338–355.*

E. M. Lewis, An Introduction to Credit Scoring, Fair, Isaac and Co., Inc., 1992, pp vv–11, 43–73.*

* cited by examiner

Primary Examiner—Vincent Millin
Assistant Examiner—Charles R. Kyle
(74) Attorney, Agent, or Firm—Armstrong Teasdale LLP

(57) ABSTRACT

A method for assessing the credit worthiness of a country is disclosed. The first step of the method is to create a database of economic scores for the country based upon a variety of economic factors. The database is kept current with frequent updates from publicly available sources and an average of the economic scores is calculated.

21 Claims, 5 Drawing Sheets

| RATING | EXPOSURE LIMITS AS % OF EQUITY | DEFINITION |
|---|---|---|
| I+ | 100% | Risk is virtually non-existent. |
| I | 100% | Risk is very remote. |
| I- | 95% | Risk is negligible. |
| II+ | 90% | Risk is very minimal. |
| II | 85% | Risk is minimal. |
| II- | 80% | Risk is very low. |
| III+ | 70% | Risk is low. |
| III | 65% | Risk is very moderate. |
| III- | 60% | Risk is moderate. |
| IV+ | 40% | Risk is rising markedly. |
| IV | 35% | Risk is moderately high. |
| IV- | 30% | Risk is high. |
| V+ | 15% | Risk is very high. |
| V | 10% | Risk is very high and mitigating factors are diminishing. |
| V- | 5% | Risk is very high and drastic action is required. |
| VI | 0% | Risk is very high and macroeconomic or political management is unpredictable. |

50 / 52 / 54

| Year | Q | T | C | D | E | F | G | U | R | S | K | V | M | N | O | P | Avg. | |
|---|---|---|---|---|---|---|---|---|---|---|---|---|---|---|---|---|---|---|
| Country 1 | 7 | 7 | 10 | 7 | 10 | 10 | 6 | 5 | 10 | 10 | 10 | 7 | 5 | 7 | 5 | 7 | 8.50 | 4 |
| Country 2 | 7 | 7 | 5 | 0 | 7 | 7 | 6 | 5 | 10 | 10 | 10 | 7 | 5 | 7 | 7 | 4 | 7.38 | 16 |
| Country 3 | 10 | 10 | 10 | 7 | 10 | 7 | 10 | 5 | 10 | 10 | 2 | 7 | 10 | 7 | 5 | 4 | 6.80 | 15 |
| Country 4 | 10 | 7 | 0 | 10 | 10 | 10 | 6 | 10 | 10 | 7 | 2 | 2 | 7 | 7 | 5 | 4 | 6.75 | 16 |
| Country 5 | 2 | 7 | 8 | 2 | 10 | 7 | 2 | 2 | 10 | 7 | 2 | 4 | 0 | 7 | 5 | 4 | 5.88 | 16 |
| Country 6 | 0 | 7 | 5 | 7 | 7 | 4 | 5 | 5 | 2 | 7 | 5 | 10 | 5 | 10 | 7 | 4 | 5.69 | 16 |
| Country 7 | 0 | 10 | 5 | 2 | 10 | 7 | 10 | 8 | 4 | 7 | 2 | 4 | 7 | 10 | 5 | 0 | 5.63 | 16 |
| Country 8 | 5 | 7 | 8 | 7 | 4 | 4 | 10 | 0 | 10 | 7 | 5 | 4 | 2 | 3 | 5 | 10 | 5.56 | 16 |
| Country 9 | 5 | 7 | 0 | 2 | 7 | 7 | 10 | 5 | 4 | 4 |   | 2 | 10 | 10 | 5 | 7 | 5.53 | 15 |
| Country 10 |   |   | 8 | 10 | 10 | 10 | 0 | 0 | 7 | 1 |   | 0 |   |   |   |   | 5.20 | 10 |
| Country 11 | 5 | 10 | 10 | 4 | 7 | 10 | 2 | 5 | 4 | 7 | 2 | 0 | 5 | 7 | 5 | 4 | 5.19 | 16 |
| Country 12 | 5 | 0 | 2 | 7 |   |   | 10 | 2 | 10 |   | 10 | 7 | 0 | 3 | 7 | 4 | 5.11 | 9 |
| Country 13 | 5 | 3 | 2 | 2 | 7 | 4 | 10 | 5 | 2 | 7 | 2 | 7 | 5 | 10 | 5 | 0 | 5.06 | 16 |
| Country 14 | 5 | 0 | 2 | 0 | 4 | 7 | 2 | 2 | 4 | 1 | 10 | 7 | 0 | 0 | 5 | 10 | 5.06 | 16 |
| Country 15 | 5 | 10 | 5 | 2 | 7 | 2 | 10 | 2 | 4 | 4 | 10 | 7 | 2 | 10 | 5 | 2 | 5.00 | 16 |
| Country 16 | 2 | 3 | 10 | 0 | 4 | 4 | 2 | 8 | 4 | 4 | 5 | 10 | 2 | 7 | 7 | 7 | 4.88 | 16 |
| Country 17 | 0 | 3 | 5 | 4 | 0 | 2 | 0 | 2 | 0 | 7 | 0 | 7 | 7 | 10 | 2 | 4 | 4.38 | 11 |
| Country 18 | 10 |   | 0 | 2 | 2 | 0 | 6 | 10 | 10 |   | 10 | 10 | 0 |   |   | 0 | 4.18 | 16 |
| Country 19 | 2 | 3 | 2 | 2 | 2 | 2 | 10 | 8 | 2 | 4 | 10 | 7 | 5 | 7 | 5 | 4 | 3.94 | 16 |
| Country 20 | 0 | 0 | 5 | 10 | 2 | 2 | 10 | 2 | 10 | 7 | 0 | 0 | 0 | 3 | 2 | 2 | 3.94 | 16 |
| Country 21 | 0 | 7 | 5 | 0 | 0 | 2 | 2 | 10 | 7 | 1 | 0 | 7 | 5 | 10 | 0 | 0 | 3.38 | 16 |
| Country 22 | 0 | 3 | 5 | 7 | 2 | 2 | 10 | 0 | 0 | 0 | 0 | 7 | 0 | 3 | 0 | 4 | 3.00 | 16 |
| Country 23 | 0 | 7 | 0 | 2 | 0 | 2 | 2 | 8 | 4 | 7 | 0 | 10 | 2 | 7 | 0 | 4 | 2.88 | 16 |
| Country 24 | 0 | 0 | 2 | 0 | 4 | 0 | 0 | 2 | 2 | 1 | 0 |   | 7 |   | 7 | 0 | 2.44 | 16 |
| Country 25 | 0 | 0 | 2 | 0 | 4 | 2 | 0 | 2 | 10 | 1 | 0 | 10 | 0 | 0 | 0 | 4 | 2.19 | 16 |

Figure 1

| 1 Year Subset | Q | T | C | D | E | F | G | U | R | S | K | V | M | N | O | P | Avg. | |
|---|---|---|---|---|---|---|---|---|---|---|---|---|---|---|---|---|---|---|
| Country 2 | 7 | 7 | 5 | 7 | 10 | 10 | 6 | 5 | 10 | 10 | 10 | 7 | 5 | 7 | 5 | 7 | 7.38 | 16 |
| Country 4 | 10 | 10 | 0 | 7 | 10 | 7 | 10 | 10 | 10 | 7 | 2 | 2 | 7 | 7 | 5 | 4 | 6.75 | 16 |
| Country 5 | 2 | 7 | 8 | 10 | 10 | 10 | 6 | 2 | 10 | 7 | 2 | 4 | 0 | 7 | 5 | 4 | 5.88 | 16 |
| Country 6 | 0 | 10 | 5 | 2 | 10 | 7 | 2 | 5 | 2 | 7 | 5 | 10 | 5 | 10 | 7 | 4 | 5.69 | 16 |
| Country 7 | 0 | 7 | 5 | 7 | 10 | 4 | 10 | 8 | 4 | 7 | 2 | 4 | 7 | 10 | 5 | 0 | 5.63 | 16 |
| Country 8 | 5 | 7 | 8 | 2 | 4 | 7 | 10 | 0 | 10 | 7 | 5 | 4 | 2 | 3 | 7 | 10 | 5.56 | 16 |
| Country 11 | 5 | 10 | 5 | 4 | 7 | 7 | 6 | 5 | 2 | 7 | 2 | 0 | 5 | 7 | 7 | 4 | 5.19 | 16 |
| Country 13 | 5 | 3 | 2 | 7 | 7 | 2 | 10 | 5 | 4 | 7 | 2 | 7 | 5 | 10 | 5 | 0 | 5.06 | 16 |
| Country 14 | 5 | 0 | 2 | 2 | 4 | 4 | 10 | 5 | 10 | 1 | 10 | 7 | 0 | 0 | 5 | 10 | 5.06 | 16 |
| Country 15 | 5 | 10 | 5 | 0 | 7 | 7 | 2 | 2 | 2 | 4 | 5 | 10 | 2 | 10 | 5 | 2 | 5.00 | 16 |
| Country 16 | 2 | 3 | 10 | 2 | 4 | 2 | 10 | 8 | 4 | 7 | 0 | 7 | 7 | 7 | 7 | 7 | 4.88 | 16 |
| Country 17 | 0 | 3 | 5 | 0 | 0 | 4 | 2 | 0 | 0 | 4 | 10 | 10 | 5 | 10 | 2 | 4 | 4.38 | 16 |
| Country 19 | 2 | 3 | 2 | 2 | 2 | 0 | 6 | 10 | 10 | 7 | 0 | 0 | 0 | 7 | 5 | 0 | 3.94 | 16 |
| Country 20 | 0 | 0 | 5 | 10 | 0 | 2 | 10 | 8 | 7 | 1 | 0 | 7 | 5 | 3 | 2 | 4 | 3.94 | 16 |
| Country 21 | 0 | 7 | 5 | 0 | 2 | 2 | 6 | 0 | 0 | 0 | 0 | 0 | 0 | 10 | 0 | 2 | 3.38 | 16 |
| Country 22 | 0 | 3 | 5 | 7 | 0 | 2 | 6 | 10 | 4 | 1 | 10 | 7 | 0 | 3 | 0 | 4 | 3.00 | 16 |
| Country 23 | 0 | 7 | 0 | 0 | 2 | 0 | 0 | 0 | 2 | 0 | 0 | 10 | 0 | 7 | 0 | 4 | 2.88 | 16 |
| Country 24 | 0 | 0 | 2 | 2 | 0 | 2 | 2 | 8 | 4 | 7 | 0 | 7 | 2 | 7 | 0 | 0 | 2.44 | 16 |
| Country 25 | 0 | 0 | 2 | 0 | 4 | 2 | 0 | 2 | 10 | 1 | 0 | 10 | 0 | 0 | 0 | 4 | 2.19 | 16 |

Figure 2

| 3 Year | A | B | C | D | E | F | G | H | I | J | K | L | M | N | O | P | Avg. | |
|---|---|---|---|---|---|---|---|---|---|---|---|---|---|---|---|---|---|---|
| Country 1 | 10 | 10 | 10 |  | 10 | 10 | 10 | 5 | 10 | 7 | 10 | 4 | 5 |  | 5 |  | 8.50 | 4 |
| Country 2 | 5 | 10 | 5 | 7 | 10 | 7 | 10 | 10 | 10 | 7 | 10 | 2 | 7 | 7 | 5 | 7 | 6.94 | 16 |
| Country 4 | 10 | 10 | 0 | 7 | 10 | 7 | 10 | 10 | 10 | 7 | 2 | 2 | 10 | 7 | 7 | 4 | 6.75 | 16 |
| Country 3 | 10 |  | 10 | 0 | 7 | 7 | 6 | 8 | 10 | 1 | 2 | 7 | 5 | 10 | 7 | 4 | 6.40 | 15 |
| Country 6 | 5 | 10 | 5 | 2 | 10 | 7 | 2 | 8 | 2 | 7 | 2 | 7 | 5 | 7 | 7 | 4 | 6.00 | 16 |
| Country 11 | 5 | 10 | 5 | 4 | 7 | 7 | 6 | 5 | 7 | 10 | 5 | 7 | 5 | 10 | 5 | 4 | 5.81 | 16 |
| Country 10 |  |  | 8 | 2 | 10 | 10 | 2 | 0 |  | 7 | 2 | 7 |  | 7 | 5 |  | 5.80 | 10 |
| Country 7 | 2 | 7 | 5 | 2 | 10 | 4 | 10 | 8 | 2 | 7 | 2 | 4 | 7 | 10 | 5 | 0 | 5.63 | 16 |
| Country 16 | 5 | 3 | 10 | 7 | 4 | 2 | 10 | 2 | 7 | 10 | 5 | 7 | 2 | 7 | 7 | 7 | 5.63 | 16 |
| Country 9 | 2 | 7 | 0 | 2 | 7 | 7 | 0 | 5 | 4 | 4 |  | 4 | 10 | 10 | 5 | 7 | 5.47 | 15 |
| Country 5 | 2 | 3 | 8 | 10 | 10 | 10 | 6 | 2 | 7 | 7 | 2 | 4 | 0 | 7 | 5 | 4 | 5.44 | 16 |
| Country 8 | 5 | 0 | 8 | 10 | 4 | 7 | 10 | 0 | 10 | 7 | 5 | 2 | 2 | 3 | 5 | 10 | 5.00 | 16 |
| Country 19 | 5 | 10 | 2 | 2 | 0 | 0 | 6 | 10 | 0 | 4 | 10 | 10 | 5 | 7 | 5 | 0 | 4.75 | 16 |
| Country 17 | 0 | 7 | 5 | 2 | 4 | 4 | 2 | 5 | 4 | 7 | 0 | 10 | 7 | 10 | 2 | 4 | 4.44 | 16 |
| Country 15 | 5 | 10 | 5 | 0 | 7 | 7 | 2 | 2 | 2 | 0 | 10 | 2 | 2 | 10 | 5 | 2 | 4.44 | 16 |
| Country 20 | 0 | 0 | 5 | 10 | 2 | 2 | 10 | 8 | 4 | 10 | 0 | 0 | 0 | 3 | 2 | 4 | 3.75 | 16 |
| Country 21 | 0 | 0 | 2 | 0 | 0 | 0 | 6 | 0 | 10 | 0 | 0 | 0 | 5 | 10 | 0 | 2 | 3.25 | 16 |
| Country 22 | 0 | 3 | 2 | 7 | 4 | 2 | 6 | 8 | 0 | 1 | 0 | 10 | 0 | 3 | 0 | 4 | 3.05 | 16 |
| Country 24 | 0 | 0 | 5 | 2 | 2 | 2 | 2 | 2 | 0 | 7 | 0 | 7 | 2 | 7 | 0 | 0 | 2.31 | 16 |
| Country 25 | 0 | 3 | 2 | 0 | 0 | 2 | 0 | 2 | 10 | 1 | 0 | 7 | 0 | 0 | 0 | 4 | 2.19 | 16 |
| Country 23 | 0 | 3 | 0 | 0 | 2 | 2 | 0 | 2 | 4 | 0 | 10 | 0 | 0 | 7 | 0 | 4 | 2.13 | 16 |

Figure 3

| RATING | EXPOSURE LIMITS AS % OF EQUITY | DEFINITION |
|---|---|---|
| I+ | 100% | Risk is virtually non-existent. |
| I | 100% | Risk is very remote. |
| I- | 95% | Risk is negligible. |
| II+ | 90% | Risk is very minimal. |
| II | 85% | Risk is minimal. |
| II- | 80% | Risk is very low. |
| III+ | 70% | Risk is low. |
| III | 65% | Risk is very moderate. |
| III- | 60% | Risk is moderate. |
| IV+ | 40% | Risk is rising markedly. |
| IV | 35% | Risk is moderately high. |
| IV- | 30% | Risk is high. |
| V+ | 15% | Risk is very high. |
| V | 10% | Risk is very high and mitigating factors are diminishing. |
| V- | 5% | Risk is very high and drastic action is required. |
| VI | 0% | Risk is very high and macroeconomic or political management is unpredictable. |

Figure 4

Aggregate Limits by Combined Risk Classes — 60

| | CUMULATIVE LIMIT |
|---|---|
| IV- and below | 80% |
| IV and below | 140% |
| IV+ and below | 200% |
| III- and below | 300% |

Figure 5

Aggregate Limits by Geographic Region — 70

| REGION | LIMITS |
|---|---|
| Asia | 120% |
| Latin America | 120% |
| Eastern Europe | 120% |
| Middle East / North Africa | 80% |
| Sub-Saharan Africa | 40% |

Figure 6

METHODS AND SYSTEMS FOR ASSESSING CREDITWORTHINESS OF A COUNTRY

BACKGROUND OF THE INVENTION

This invention relates generally to risk management in international lending and, more particularly, to assessing the risks associated with the lending on a per country basis.

Following the dissipation of bipolar international relations and the global adoption of economic liberalization, new opportunities exist for debt and equity financing in developing countries. At the same time, the domestic market has become saturated. International lending, with respect to long-term growth and profitability, has implications in the way business is done and risk is assessed. In addition to the requirement of accurately measuring projects and credit risks of new operations, the risk owing to the extraterritoriality must be considered. This risk is generally described as country or sovereign risk.

The rationale of a country risk assessment is justified, for example, by reviewing World Bank experience in the area of project finance. Unfavorable economic conditions in developing countries, overlooked adverse macroeconomic or sectoral policies in borrowing countries, overly optimistic projections on investment returns, and the tendency of World Bank management to focus on loan volume can present challenges. Of course, the World Bank's concern is not timely payment, rather it is ultimate payment. By contrast, a policy of that type would affect the income statement of a private lender. The risk is broken down into two components country risk analysis or assessment and country risk management. The objective of country risk assessment is then not to avoid risk, but to manage it prudently.

BRIEF SUMMARY OF THE INVENTION

It is therefore seen to be desirable to have a method for assessing the credit worthiness of a country. The method includes creating a database of economic scores for the country, the economic scores are standards based upon multiple available economic factors, examples include gross domestic product (GDP) and consumer price index (CPI). The database is kept current with frequent updates from publicly available sources. Averages of the economic scores for the various available economic factors are calculated in order to generate a risk factor for a particular country.

BRIEF DESCRIPTION OF THE DRAWINGS

FIG. 1 is a chart showing risk scores of a set of countries, for a set of economic indicators, over a one year period;

FIG. 2 is a chart showing a subset of the countries from FIG. 1, chosen on the basis of the availability of the economic indicators from FIG. 1;

FIG. 3 is a chart showing risk scores of a set of countries, for a set of economic indicators, over a three year period;

FIG. 4 is a rating scale that includes sixteen rating categories;

FIG. 5 is a chart showing an example cumulative exposure limit, as a percentage of total investment, for countries at or below a rating category; and FIG. 6 is a chart showing an example exposure limit, as a percentage of total investment, for particular geographic regions.

DETAILED DESCRIPTION OF THE INVENTION

FIGS. 1 through 4 are charts showing a set of exemplary risk assessment factors for evaluating credit worthiness of a set of countries. Risk assessment factors are certain economic factors. An exemplary, non-exhaustive list of economic factors shown in FIGS. 1 through 4 are labeled A through V and described as follows:

A Consumer Price Index over one year

Inflation is usually measured by the consumer price index (CPI). Inflation distorts the efficient, allocation of resources and creates poverty. When looking at the data we must remember that the basket of goods that determines the CPI differs from country-to-country and should differ between per-capita income levels (poorer countries consume a larger proportion of their national income in food than richer countries, Engel's law).

B Labor Productivity over one year

The change in labor productivity is approximated by subtracting the growth in employment from the growth in output. This ratio is important especially in countries with limited monetary tools. The only way to improve their competitiveness lies in reducing their domestic costs or raising productivity. Labor costs is also an important structural factor. It includes such quantitative elements as wage growth and indirect labor costs, as well as more qualitative elements such as labor market flexibility (severance pay arrangements, pensions, hiring and firing practices, collective bargaining). Low labor costs may be particularly important in an emerging market with a high birth rate.

C Gross Domestic Product over one year

Growth of a country's gross domestic product is important as an indicator for the country's development potential.

D ST Debt-Reserves over one year

Short-term Debt to Total Debt: A high ratio raises the vulnerability for a country because of its continuous need to refinance maturing obligations (principal). There may be occasional lack of market access, or refinancing may be costly because of a changed interest-rate environment etc.

E Debt Service Ratio over one year

This is an important flow ratio and it expresses annual interest and principal payments as a percentage of current receipts. This shows the capacity of the country to service its obligations in a timely manner.

F External Debt —Exports over one year

Foreign Currency Debt to Exports shows how much of the country's current receipts, i.e. its receipts from exports of goods and services and net positive transfers are absorbed by the country's debt stock.

G Reserves —Import Cover over one year

Debt Service Ratio Adjusted by Minimum Imports: In a situation of foreign exchange shortage, a country may act to compress levels of imports in order to save foreign currency. However, there is a minimum level of imports required for any country, including such import items as fuel and food. This ratio modifies the debt service ratio by subtracting an assumed minimum level of imports (estimated at 60% of a three-year moving average of imports) from the country's current receipts. The ratio then indicates, how much of the residual will be absorbed by debt service payments.

H Net FDI-CA Payments over one year

Foreign Direct Investment (FDI) is a non-debt creating capital inflow that may help to finance a country's current account deficit without directly affecting its debt profile. However, distinctions must be made. For example, FDI that is the result of privatization is a one-off investment by foreign investors. Also, privatization of state assets often takes place in the nontradable sectors. Therefore, this type of FDI might not result in future export receipts. FDI that is unrelated to privatization, on the other hand, is usually channeled towards export-oriented sectors, strengthens the country's foreign exchange earnings capacity, and is more of a vote-of-confidence in the overall political and economic management of the country.

I Current Account Receipts over one year

This is a key ratio, as it is measured as a percentage of GDP. A deficit on the current account of the balance-of-payments means that domestic savings are not sufficient to cover domestic investments. In other words, a country's exports of goods and services are exceeded by its imports. Therefore, a country must draw on foreign savings, i.e. it must borrow money, attract foreign (non-debt creating) investment or it must draw down on its international reserves. The analysis is to establish whether any imbalances may be cyclical or structural.

J General Government Balance over one year

Public Sector Balance. The deficit or surplus position of general government (which includes the central government, lower levels of government, and public, non-financial sector enterprises) is a key variable to risk analysis. High and prolonged public sector deficits —public dissavings —lead to high domestic interest rates which prohibit private sector investments, stunt economic growth, and negatively affect the current account balance of the country.

These deficits need to be financed through money creation (monetization) which is inflationary and/or through borrowing (internal and external) which brings about increased debt and rising debt service burdens and may ultimately lead into a debt trap.

The historical and current data will be evaluated largely on their comparative strength or weakness. Projections will deal with the various structural elements for government to reduce imbalances (broadening tax base, simplifying tax code, reducing tax evasion, reducing transfer payments, strengthening human and physical infrastructure expenditures of the budget).

K Real Interest Rate over one year

High real interest rates prohibit economic growth and may lead to an appreciation of the local exchange rate. Negative real interest rates further fuel inflation.

L Real Money Growth (M2) over one year

Money supply growth that exceeds real economic growth on a consistent basis leads to inflation at least equal to the monetary overhang.

M Industrial Production Growth over three years

A time series of this index shows, how the composition of GDP of a country might change given the change in volume of production in manufacturing, mining, construction, and the electricity, gas and water industries.

N Real Gross Domestic Product Growth over three years

Real, i.e. inflation-adjusted growth of a country's gross domestic product is important as an indicator for the country's development potential. Obviously, sustained growth is an indicator of a sound economy. It must be seen against a number of factors, such as a country's current stage of development (industrialized countries require less growth than emerging markets that want to catch up) or external debt levels (a country with a high debt level needs vigorous growth levels to lower its debt/GDP ratio).

Real GDP Per Capita Growth. This is a good indicator for a country's tax base. The public sector may have to draw on that tax base to repay its debt. It is also an important social indicator, calculating the average wealth of the population.

O Domestic Credit Creation over three years

This is the growth of the domestic component of money supply (M2 net foreign assets) adjusted by inflation. This supply is now compared to the demand for money as expressed by real GDP growth. If the former consistently exceeds the latter, this leads to a deterioration of the balance of payments of the country because domestic absorption is raised (therefore, less exports) and domestic purchasing power is increased (therefore, more imports).

P Export Growth —Import Growth over three years

This indicator shows whether the trade balance of a country is strengthening or weakening Q Consumer Price Index Inflation over three years
Inflation is defined under A above.

R Current Account Receipts over three years
Current Accounts receipts are defined in I above S General Government Balance over three years
General Government Balance defined in J above.

T Labor Productivity over three years
Labor Productivity defined in B above.

U Net FDI —CA Payments over three years
Foreign Direct Investment (FDI) is defined in H above.

V Real Money Growth (M2) over three years
Real Money Growth is defined in L above.

Referring specifically to FIG. 1, a chart 10 showing risk factors 12 for a set of countries 14, using a set of sixteen economic indicators 16 as described above, over a one year period is shown. For each country 14, scores 18 are assigned for each economic indicator 16 where data for that country 14, is available. Data for each country is gathered through publicly available sources such as a central bank or other statistical bureaus, such as the International Monetary Fund, for example, and assigned a value, from zero to ten based upon the data gathered. The value assigned is based upon a chosen absolute standard which is chosen for each economic indicator 16. For example, if an optimal interest rate is determined to be 3%, and the actual interest rate is 3%, a value of 10 is assigned for that particular economic indicator 16. However, if the actual interest rate is 2% or 4% a value of 6 might be assigned.

In one exemplary embodiment, risk factors 12 are calculated by summing the sixteen economic factors 16, and dividing by the number 22 of economic factors 16 available for a particular country. For example, for Country 1 20, the risk factor 12 is 8.50 out of an optimal of 10. However, for Country 1 20, only four out of the sixteen economic factors 16 are available. Therefore the risk factor 12 for Country 1 20, is not a reliable number. Referring to Country 2 24, although the risk factor 12 is a lower number of 7.38, the risk factor 12 is a more reliable number because it is based on all sixteen economic factors 16.

In an alternative embodiment, each of the sixteen economic factors 16, can be assigned a weighting value. The weighting value would change a relative impact of each economic factor 16 with respect to one another as a risk factor is calculated by averaging the available economic data.

Country data can be sorted according to the availability of economic factors 16 as shown in FIG. 2. FIG. 2 is a chart showing a subset 30 of the countries in FIG. 1, where the countries shown in subset 30 are those having all sixteen economic factors 16 available. Sorting countries based on the availability of economic factors 16 results in data best suited for informed decision making and evaluations of a country as an investment choice.

The economic factors 16 and risk factors 12 described above are used in conjunction with other qualitative and quantitative criteria in implementing a country risk assessment system. Other criteria are economic, financial, political, and social factors that are an essential concern to foreign investors. These factors that may interfere with an ability or willingness of a country and its economic agents to honor their financial or contractual obligations to non-resident owners of debt or equity in a timely manner have to be considered by a lending entity. Other factors that are to be considered are listed below.

Depth and Strength of the Financial System is a factor that takes into consideration the development of the local banking sector (level of supervision and regulation, credit experience vs. riding hyperinflation, overbanked vs. underserviced, competition vs. collusion). Analysis of the local capital (bond & equity) market (benchmarks, market capitalization, existence of efficient clearing, registration and central deposit systems) are also included.

Monetary and Fiscal Policy Volatility in policy-making is intuitively and increasingly empirically considered a major factor in determining future economic growth. The volatility is measured by fluctuations of exchange rates, the number of changes in exchange rate regimes, fiscal performance, etc.

Ratio of Current Account Balance to Exports is a useful ratio because a dollar-denominated denominator is used. The current account/GDP ratio uses GDP denominated in local currency. If the local currency is overvalued the size of a given current account deficit would be underestimated.

Growth Rates and Composition of Imports. High capital goods imports bode well for future growth. Rapid growth of consumer imports may reveal underlying weaknesses.

Short-term Capital Inflows Plus Portfolio Investments to Gross Capital Inflows is an indicator of the speculative element of capital inflows, which are confidence sensitive and are also highly correlated to the direction of U.S. interest rates.

International Reserves Coverage of Imports is an indicator that tells how long current import levels could be theoretically sustained without international financing. The shortcoming of this ratio is that the build-up of reserves may be the result of extensive borrowing by the country.

Foreign-Currency Debt to GDP is an indicator which measures a country's debt stock as it relates to the size of its economy, and, therefore, to its long-term ability to repay. However, this ratio may be distorted by an overvalued exchange rate.

Public Sector Debt to GDP helps in understanding the overall indebtedness of the public sector in domestic and foreign currency. High domestic debt may affect local interest rates and default on such debt may spill over onto the external sector.

Total Public Sector Debt Service to Government Revenue is a ratio that shows how much room there is for discretionary spending by government. Less room for such spending raises the probability of default.

Default History has an impact on the creditworthiness of a country. Important quantitative measures are: existing arrears on interest or principal; number of IMF/World Bank stabilization programs; number of Paris Club defaults/restructuring; number of London Club defaults/restructuring; Brady bond defaults/reschedulings; etc.).

Access to Financing is a measure that looks at the size of the economy (a larger economy generally has more access to capital markets); existing credit lines with commercial banks etc. But the measure also takes into consideration the country's position with the IMF. Every country has a quota with the IMF on which it can draw. The balance of that quota will be factored into this measure. If a country is currently receiving IMF-financing, the country's likely compliance with the conditions for additional tranches is also assessed.

Investment Efficiency is a ratio of a three-year moving average of real GDP growth divided by the average investment ratio for the same period. The higher the ratio the more efficient was the placement of investments.

Exports to GDP is a ratio indexing of the openness of the economy. In a time series, this ratio provides a good picture of the allocation of resources towards the tradable sector, and it is an indicator for future debt-servicing capacity.

Terms-of-Trade is a ratio of export prices to import prices and it serves as a measure of improvement or deterioration of a country's balance-of-payments position and prospects.

Real Effective Exchange Rate is taken as a measure of the country's relative competitiveness. Real Effective Exchange Rate looks at a country's nominal exchange rate movements and adjusts for differentials in price increases between a country and its major trading partners to determine whether an exchange rate is appreciating (which suggests that its exports are becoming more expensive, i.e. less competitive in relative terms) or whether the exchange rate is depreciating (exports are becoming more competitive).

Export Quality Index

Net Unrequited Transfers to Exports. In many emerging markets, large portions of the work force live abroad and remit parts of their incomes to their countries of origin. These flows are captured in the current account as private remittances. Although they have a certain degree of reliability, they may also mask the underlying vulnerability of the current account balance should the flows discontinue for internal or external reasons.

Manufactured Exports to Total Exports. Manufactured goods are less price-volatile than commodities. A higher share of manufactured exports to total exports usually indicates a more advanced and less vulnerable economy. By the same token, these exports may contain very little value-added from the emerging market, if they largely consist of re-exports. Re-exports, are also highly correlated to imports so that their impact on the net foreign asset position of a country is less significant.

Export Vulnerability Index is the share of the three major commodities in total merchandise exports and indicates whether the external balance may be subject to certain price shocks or substitution effects.

Diversification of Trade Partners. As far as a country's exports are income-elastic, i.e. as their volume depends on economic growth in the importing country, a high concentration of export markets may make expected receipts vulnerable to economic downturns in the importing country/countries.

Political Stability

The analysis of the system of Government account the degree of institution-building, perceived legitimacy of government, good governance, participatory nature of the system, ethnic and religious inclusion, and power of constituencies. It is not a value judgment on the form of government, but rather an evaluation of the efficiency, effectiveness and sustainability of the system in place.

The Rule of Law and Legal Recourse measure looks at the legal system in the country (constitution, property rights, commercial law, bankruptcy law, unfair practices, antitrust legislation, etc.) and evaluates compliance by major political and economic actors and the degree to which the letter of the law is enforced by an independent judiciary.

Transparency is the degree to which corruption is affecting commercial and social life as measured, for example, by Transparency International.

External stability is an assessment of the risk of hostile conflict with other countries, and also takes into consideration the degree of political and economic integration.

Social Conditions

Income distribution as measured by the GINI-coefficient, which is a standard measure of the degree of income inequality among a country's population, shows how evenly income is distributed. Uneven income distribution reduces the potential benefit of rising national income on stimulating domestic demand, it might pose a threat to political stability or it might put pressure on budgetary expenditures designed to compensate for the unevenness.

Unemployment & underemployment leads to political, as well as economic distortions. Poor macroeconomic management often leads to the formation of a sizable informal sector, i.e. an underground economy that is not captured by official employment or national output statistics and usually produces subsistence-level employment, while it also leads to depressed wages and to a loss of government revenue.

Overall Social Development Index includes in equal weights: birthrates, levels of urbanization, poverty rates, infant mortality rates, life expectancy rates, and literacy rates.

Exogenous Factors

Material Increase in International Interest Rates: The actual outbreak of all debt crises of the 20th century has been —in part —attributed to an increase in U.S. interest rates. Portfolio investments in emerging markets seem especially affected by such development.

Economic Activity in Industrialized Countries: An economic slowdown in industrialized countries leads to capital inflows in the emerging markets and vice versa. However, these effects are partly offset by the impact of slower/faster growth in industrialized countries on the export performance of emerging markets.

Force Majeure: Natural disasters, such as earthquakes, floods, or droughts may affect the production levels of a country.

Yield Spreads: Market opinion is reflected by a cross-country comparison of yield spreads on equal or similar instruments.

Country Risk Assessment

The country risk assessment system has several functions. The system will monitor the risk profile of a group of cross-border assets on a continuous basis in order to limit exposure to any one risk. The system will assure that risk and rewards are commensurate and assist in developing mechanisms to insulate individual operations from country risk. Basing the country risk assessment system on an intranet allows for more interactive updating and provides more functionality.

Measuring with some degree of reliability a probability of an occurrence, such as described above, can alleviate investor concerns. The risk may be a liquidity issue, a short-term problem, or the risk may materialize over time because of underlying structural weaknesses, a medium-term to long-term problem. A separate rating is assigned to all countries assessing the liquidity risk of that country.

The country risk assessment system evaluates risks associated with the transfer of currencies. The country risk assessment system evaluates and assesses credit risks and ranks countries into investment strength categories in view of investment risk and provides guidelines to lenders on how to allocate funds based on risk and expected return. The investment strength rating for medium-term to long-term risk determines an allowed aggregate country exposure.

Transfer risk exists when there is a probability that a country will not have enough currency or will not allow exchange of currencies to occur. In emerging markets, there are private sector borrowers that have greater financial strength than their governments. Yet those private sector borrowers are constrained by the risk level assumed for the country as a whole because in times of economic distress, foreign exchange shortage, or any arbitrary reason, it is within the control of the government to ration the available foreign exchange through regulations. The regulations include regulation of foreign-exchange deposits, foreign exchange controls, or drastic measures such as expropriation.

Volatility risk is a risk that a market value of a given investment might fluctuate. Currency movements or stock market oscillations can materially affect market value of cross-border investments, especially in emerging markets. A separate rating is assigned to all countries assessing the volatility risk of that country.

Certain countries have local or regional units of government. It is possible that these units of government could use their legal empowerment to delay or discontinue transactions. A term describing the above conditions is subnational risk and is often referred to as contract frustration. Subnational risk is a guiding factor in portfolio composition investment exposure in a given country.

Economic data taken over a one year period is sometimes not sufficient to provide prudent information for making investments such as debt and equity financing, especially when it comes to international investing. Referring to FIG. 3, a chart 40 is shown ranking the countries shown in FIG. 1 using economic indicators 16 for a three year period. FIG. 3 shows there is shifting in the rankings of countries. The shifting in the rankings is partly due to different economic factors 16 used in ranking the countries over the three year period.

Country Rating Methodology

A rating scale 50 that includes sixteen rating categories 52 ranging from I+(the lowest risk) to VI (the highest risk) is shown in FIG. 4 and measure a country's ability and willingness to meet its financial and contractual obligations to non-resident investors in a timely manner. A rating is assigned for each individual country based on a risk assessment. Sixteen rating categories 52 allow for sufficient differentiation of credit risk and is different from known credit rating methodologies in that rating scale is compressed at the top, eliminating one rating category, because risk distinctions at the top are so small. Rating scale 50 is also more compressed at the bottom, because after a certain cut-off point investments are not advisable, whereas existing rating systems distinguish between the severity of default. Finally the rating includes factors not considered by rating agencies because the country rating methodology helps manage debt and equity exposure to countries, while rating agencies only measure the risk of default of fixed income investments.

All country ratings for individual countries are assigned based on thorough quantitative analysis and qualitative factors taking past, current and expected performance including information obtained through the country risk assessment system into account. A country exposure (not shown) provides a dollar limit on the capital available to each country based upon where the country is rated, and the risk assessment.

An exposure limit 54 is assigned to each rating category, expressed as a percentage of total capital. A relationship between exposure and capital manifests the capability of a lender to withstand a risk event, should a risk event come to pass. Exposure limit 54 is translated into US dollars. Determining exposure limits is not an exact science because the methodology in determining risks is based on analytical judgement. Functionality of the rating scale and the exposure limits are continuously monitored to allow for improvements when necessary. Risk definitions 56 define the risk associated with each rating category 52.

Occurrence of a transfer risk crisis rises disproportionately as ratings attached to the borrowers or bond issuers declines and is taken into consideration when determining exposure limits 54. Exposure limits 54 are roughly the inverse of observed historical default. Where risk is higher (historical occurrence of default), the lower the exposure limit 54. Risk in higher-rated categories is small and distinctions between highly rated categories are less significant. However, risk of countries rated below III—rises disproportionately, and distinctions between rating categories 52 widen.

An example of an exposure limit table 60 for combined risk classes is shown in FIG. 5. Exposure limit table 60 uses cumulative limits 62 to protect a portfolio from an imprudent concentration of investments in countries with low creditworthiness.

Another way to protect a cross-border portfolio is to set a maximum aggregate exposure limit by geographic region. An exemplary example of a geographic region exposure chart 70 is shown in FIG. 6. Regions 72 with a higher percentage exposure limit 74 have a credit worthiness markedly above that of other geographic region in the emerging markets.

The country rating system uses multiple exposure limits, such as an exposure limit for all cross border transactions, country limits, combined rating category limits 62, and geographic region 72 limits 74. Any investment in any cross border transaction complies with all of the exposure limits (i.e. the additional cross border transaction must not lead to an excess of the overall limit, the country limit, the geographic region 72 limit 74, or the combined rating category exposure limit 62).

A country limit constrains investment exposure on the basis of the country of residence of the ultimate obligor or guarantor or place of business, and includes all cross-border exposures arising from loans and other credit-related exposures, direct and portfolio investments, legal commitments and other contingencies, derivative products and forex transactions. While the invention has been described in terms of various specific embodiments, those skilled in the art will recognize that the invention can be practiced with modification within the spirit and scope of the claims.

What is claimed is:

1. (currently amended) A method for assessing the credit worthiness of a country, said method comprising the steps of:

identifying a plurality of quantitative economic indicators for the country, the plurality of economic indicators include consumer price index, labor productivity change, gross domestic product growth, short term debt to total debt, debt service ratio, foreign currency debt to exports, debt service ratio adjusted by minimum imports, foreign direct investment, current account receipts, general government balance, real interest rate, real money growth, industrial production growth, real gross domestic product growth, domestic credit creation, and export growth to import growth;

determining which economic indicators are computable for the country using economic data stored in a database;

assigning a desired value to each of the computable economic indicators;

utilizing a computer processor to calculate economic scores for the country wherein each of the economic scores is a quantitative value relating a value of a computable economic indicator to the assigned desired value of the same computable economic indicator;

storing the economic scores in the database;

keeping the database current with frequent updates from publicly available sources;

calculating an average of the economic scores for the country; and assigning a risk factor to the country indicating credit worthiness of the country wherein the risk factor is based on the calculated economic score average.

2. A method according to claim 1, wherein said step of calculating an average of the economic scores, further comprises the step of calculating an average based on a particular number of economic indicators available for a particular country.

3. A method according to claim 1, wherein said step of utilizing a computer processor to calculate economic scores further comprises utilizing a computer processor to calculate economic scores wherein each of the economic scores is assigned a weight.

4. A method according to claim 1, wherein said step of keeping the database current with frequent updates from publicly available sources, further comprises the step of using an intranet to distribute data from the database.

5. A method according to claim 1, wherein said step of keeping the database current with frequent updates from publicly available sources, further comprises the step of downloading data directly from the central bank of a country or other statistical bureaus.

6. A method according to claim 1, wherein said step of utilizing a computer processor to calculate economic scores further comprises utilizing a computer processor to calculate economic scores wherein each of the economic scores calculated is based upon a value of an economic indicator.

7. A method according to claim 1, wherein said step of assigning a desired value to each of the computable economic indicators further comprises assigning a desired value to each of the computable economic indicators wherein the desired value is selected as an absolute standard upon which the scores are based.

8. A method according to claim 1, further comprising the step of monitoring a risk profile on a continuing basis to limit exposure to any one risk.

9. A method according to claim 1, further comprising the step of monitoring risks associated with the transfer of currency.

10. A system configured to assess the credit worthiness of a country, said system comprising:

a database storing economic data for a country;

a processor further configured to:

analyze a plurality of quantitative economic indicators for the country, said plurality of economic indicators include consumer price index, labor productivity change, gross domestic product growth, short term debt to total debt, debt service ratio, foreign currency debt to exports, debt service ratio adjusted by minimum imports, foreign direct investment, current account receipts, general government balance, real interest rate, real money growth, industrial production growth, real gross domestic product growth, domestic credit creation, and export growth to import growth;

determine which economic indicators are computable for the country using the economic data stored in the database;

assign a desired value to each of the computable economic indicators;

calculate economic scores for the country wherein each of the economic scores is a quantitative value relating a value of a computable economic indicator to the assigned desired value of the same computable economic indicator;

store the economic scores in the database;

keep the database current with frequent updates from publicly available sources;

calculate an average of the economic scores for the country; and assign a risk factor to the country indicating credit worthiness of the country wherein the risk factor is based on the calculated economic score average; and a user interface for presenting the economic scores and risk factors.

11. A system in accordance with claim 10, wherein said processor is further configured to calculate averages of the economic scores based on a number of economic indicators available for a particular country.

12. A system in accordance with claim 10, wherein said processor is further configured to assign a weight to each of the economic scores.

13. A system in accordance with claim 10, wherein said processor is further configured to use an intranet to distribute data from the database.

14. A system in accordance with claim 10, wherein said processor is further configured to download economic data directly from the central bank of a country or other statistical bureaus.

15. A system in accordance with claim 10, wherein said processor is further configured to calculate an economic score based upon a value of an economic indicator.

16. A system in accordance with claim 10, wherein said processor is further configured to assign a desired value to each of the economic indicators by selecting a particular value of an economic indicator as an absolute standard upon which to base the economic scores.

17. A system in accordance with claim 10, wherein said processor is further configured to monitor a risk profile on a continuing basis to limit exposure to any one risk.

18. A system in accordance with claim 17, wherein said processor is further configured to monitor risks associated with the transfer of currency.

19. A system in accordance with claim 18, wherein said processor is further configured to determine a probability that a country will not have enough currency or allow an exchange of currency to occur.

20. A method for assessing the credit worthiness of a country, said method comprising the steps of:

identifying a plurality of quantitative economic indicators for the country, the plurality of economic indicators include consumer price index, labor productivity change, gross domestic product growth, short term debt to total debt, debt service ratio, foreign currency debt to exports, debt service ratio adjusted by minimum imports, foreign direct investment, current account receipts, general government balance, real interest rate, real money growth, industrial production growth, real gross domestic product growth, domestic credit creation, and export growth to import growth;

determining which economic indicators are computable for the country using economic data stored in a database;

assigning a desired value to each of the computable economic indicators;

utilizing a computer processor to calculate economic scores for the country wherein each of the economic scores is a quantitative value that is based upon a value of a computable economic indicator as compared to the assigned desired value of the same computable economic indicator;

storing the economic scores in the database;

keeping the database current with frequent updates from publicly available sources;

calculating an average of the economic scores for the country; and assigning a risk factor to the country indicating credit worthiness of the country wherein the risk factor is based on the calculated economic score average.

21. A system configured to assess the credit worthiness of a country, said system comprising:

a database storing economic data for a country;

a processor further configured to:

analyze a plurality of quantitative economic indicators for the country, said plurality of economic indicators include consumer price index, labor productivity change, gross domestic product growth, short term debt to total debt, debt service ratio, foreign currency debt to exports, debt service ratio adjusted by minimum imports, foreign direct investment, current account receipts, general government balance, real interest rate, real money growth, industrial production growth, real gross domestic product growth, domestic credit creation, and export growth to import growth;

determine which economic indicators are computable for the country using economic data stored in the database;

assign a desired value to each of the computable economic indicators;

calculate economic scores for the country wherein each of the economic scores is a quantitative value that is based upon a value of a computable economic indicator as compared to the assigned desired value of the same computable economic indicator;

store the economic scores in the database;

keep the database current with frequent updates from publicly available sources; calculate an average of the economic scores for the country; and assign a risk factor to the country indicating credit worthiness of the country wherein the risk factor is based on the calculated economic score average, and a user interface for presenting the economic scores and risk factors.

* * * * *